US009519506B2

(12) United States Patent
Collin et al.

(10) Patent No.: US 9,519,506 B2
(45) Date of Patent: Dec. 13, 2016

(54) METHOD AND APPARATUS FOR ENABLING REMOTE SERVICE TASK BASED ACCESS TO FUNCTIONALITY PROVIDED BY ONE OR MORE REMOTE SERVICES

(75) Inventors: Richard Michael Collin, East Sussex (GB); Simon Paul Turvey, Herts (GB)

(73) Assignee: Nokia Technologies Oy, Espoo (FI)

( * ) Notice: Subject to any disclaimer, the term of this patent is extended or adjusted under 35 U.S.C. 154(b) by 419 days.

(21) Appl. No.: 13/538,767

(22) Filed: Jun. 29, 2012

(65) Prior Publication Data

US 2014/0007113 A1    Jan. 2, 2014

(51) Int. Cl.
G06F 9/46     (2006.01)
G06F 15/16    (2006.01)
G06F 17/30    (2006.01)
H04L 29/08    (2006.01)
G06F 9/50     (2006.01)

(52) U.S. Cl.
CPC ............... *G06F 9/46* (2013.01); *G06F 9/5055* (2013.01); *H04L 67/16* (2013.01); *G06F 17/30864* (2013.01); *G06F 2209/5015* (2013.01)

(58) Field of Classification Search
None
See application file for complete search history.

(56) References Cited

U.S. PATENT DOCUMENTS

| 6,359,711 B1 * | 3/2002 | Cole ............... H04L 29/06 340/5.61 |
| 6,757,262 B1 * | 6/2004 | Weisshaar et al. ........... 709/228 |
| 2006/0004764 A1 | 1/2006 | Kurhekar et al. |
| 2008/0046435 A1 * | 2/2008 | Watson et al. ................. 707/10 |
| 2008/0114743 A1 | 5/2008 | Venkataraman et al. |
| 2008/0195630 A1 | 8/2008 | Exartier et al. |
| 2010/0281012 A1 | 11/2010 | Imig et al. |
| 2012/0016678 A1 * | 1/2012 | Gruber ............... G06F 17/3087 704/275 |
| 2012/0166467 A1 | 6/2012 | Feild et al. |

FOREIGN PATENT DOCUMENTS

WO    WO-2007/113164 A1    10/2007

OTHER PUBLICATIONS

Jack Purcher; Apple introduces us to Siri, the Killer Patent, Patently Apple Jan. 19, 2012.*
International Search Report and Written Opinion for Application No. PCT/IB2013/055290 dated Mar. 10, 2014.

(Continued)

*Primary Examiner* — Bing Zhao

(74) *Attorney, Agent, or Firm* — Alston & Bird LLP

(57) ABSTRACT

Methods, apparatuses, and computer program products are provided herein for enabling task based access to functionality provided by one or more remote services. One example method may include generating a task based query, the task based query suggestive of a task to be performed. A method may further include causing the task based query to be provided to a remote service discovery engine. A method may further include receiving an indication of a remote service of a plurality of remote services that is configured to perform the task from the remote service discovery engine, the indication comprising access instructions for querying the remote service.

10 Claims, 7 Drawing Sheets

(56) References Cited

OTHER PUBLICATIONS

Office Action for Taiwanese Application No. 102123262 dated Sep. 10, 2015.
Partial Supplementary European Search Report for corresponding European Application No. 13809616.9 dated Feb. 10, 2016, 6 pages.
Extended European Search Report for corresponding European Patent Application No. 13809616.9 dated Jun. 2, 2016, 11 pages.
Supplementary European Search Report for corresponding European Patent Application No. 13809616.9 dated Jun. 21, 2016.

* cited by examiner

METHOD AND APPARATUS FOR ENABLING REMOTE SERVICE TASK BASED ACCESS TO FUNCTIONALITY PROVIDED BY ONE OR MORE REMOTE SERVICES

TECHNOLOGICAL FIELD

Embodiments of the present invention relate generally to task based operating environments and, more particularly, relate to a method, apparatus, and computer program product for remote service access.

BACKGROUND

Methods, apparatuses, and computer program products are provided herein for enabling one or more tasks to be chained together, such that a user interacting with a user interface may scroll, back step or otherwise navigate through the one or more tasks in the task chain that may cross one or more software packages. In some example embodiments, a task is added to a task chain at the time the task is launched. In further examples, a task launch may cause a task to be performed in another software package. Therefore, as tasks are added to the task chain, a user, via the user interface, may scroll backwards and forwards through the tasks and advantageously, for example, may scroll through tasks across software packages. The user may then select a particular task in the task chain, which enables the user to view that task in the particular software package that generated and/or otherwise provided the task.

BRIEF SUMMARY

Methods, apparatuses, and computer program products are provided herein for enabling task based access to functionality provided by one or more remote services. In some example embodiments, a task based query may be generated in an instance in which a local software package is not configured to provide functionality that corresponds to an identified task. In other example embodiments a remote service may provide additional functionality to an identified local software package. The identified task may be input via the user interface, generated in response to a user action, generated by a software package or the like. The task based query may be generated such that it is configured to be ingested by a remote service discovery engine. In some example embodiments, the remote service discovery engine has stored or otherwise determined a functionality provided by a plurality of remote services. As such and in an instance in which a task based query is received, the remote service discovery engine may be configured to provide access information for a remote service that provides functionality that corresponds to the received task based query. The access information may then be used to connect to the remote service to provide the functionality that corresponds to an identified task.

In some example embodiments, a method is provided that comprises generating a task based query, the task based query suggestive of a task to be performed. The method of this embodiment may also include causing the task based query to be provided to a remote service discovery engine. The method of this embodiment may also include receiving an indication of a remote service of a plurality of remote services that is configured to perform the task from the remote service discovery engine, the indication comprising access instructions for querying the remote service.

In further example embodiments, an apparatus is provided that includes at least one processor and at least one memory including computer program code with the at least one memory and the computer program code being configured, with the at least one processor, to cause the apparatus to at least generate a task based query, the task based query suggestive of a task to be performed. The at least one memory and computer program code may also be configured to, with the at least one processor, cause the apparatus to cause the task based query to be provided to a remote service discovery engine. The at least one memory and computer program code may also be configured to, with the at least one processor, cause the apparatus to receive an indication of a remote service of a plurality of remote services that is configured to perform the task from the remote service discovery engine, the indication comprising access instructions for querying the remote service.

In yet further example embodiments, a computer program product may be provided that includes at least one non-transitory computer-readable storage medium having computer-readable program instructions stored therein with the computer-readable program instructions including program instructions configured to generate a task based query, the task based query suggestive of a task to be performed. The computer-readable program instructions may also include program instructions configured to cause the task based query to be provided to a remote service discovery engine. The computer-readable program instructions may also include program instructions configured to receive an indication of a remote service of a plurality of remote services that is configured to perform the task from the remote service discovery engine, the indication comprising access instructions for querying the remote service.

In yet further example embodiments, an apparatus is provided that includes means for generating a task based query, the task based query suggestive of a task to be performed. The apparatus of this embodiment may also include means for causing the task based query to be provided to a remote service discovery engine. The apparatus of this embodiment may also include means for receiving an indication of a remote service of a plurality of remote services that is configured to perform the task from the remote service discovery engine, the indication comprising access instructions for querying the remote service.

In some example embodiments, a method is provided that comprises receiving a task based query. The method of this embodiment may also include determining a remote service of a plurality of remote services that is configured to perform a task related to the task based query. The method of this embodiment may also include generating access instructions for the remote service of the plurality of remote services, the access instructions comprising access instructions for querying the remote service.

In further example embodiments, an apparatus is provided that includes at least one processor and at least one memory including computer program code with the at least one memory and the computer program code being configured, with the at least one processor, to cause the apparatus to at least receive a task based query. The at least one memory and computer program code may also be configured to, with the at least one processor, cause the apparatus to determine a remote service of a plurality of remote services that is configured to perform a task related to the task based query. The at least one memory and computer program code may also be configured to, with the at least one processor, cause the apparatus to generate access instructions for the remote service of the plurality of remote services, the access instructions comprising access instructions for querying the remote service.

In yet further example embodiments, a computer program product may be provided that includes at least one non-transitory computer-readable storage medium having computer-readable program instructions stored therein with the computer-readable program instructions including program instructions configured to receive a task based query. The computer-readable program instructions may also include program instructions configured to determine a remote service of a plurality of remote services that is configured to perform a task related to the task based query. The computer-readable program instructions may also include program instructions configured to generate access instructions for the remote service of the plurality of remote services, the access instructions comprising access instructions for querying the remote service.

In yet further example embodiments, an apparatus is provided that includes means for receiving a task based query. The apparatus of this embodiment may also include means for determining a remote service of a plurality of remote services that is configured to perform a task related to the task based query. The apparatus of this embodiment may also include means for generating access instructions for the remote service of the plurality of remote services, the access instructions comprising access instructions for querying the remote service.

BRIEF DESCRIPTION OF THE DRAWINGS

Figure 1:
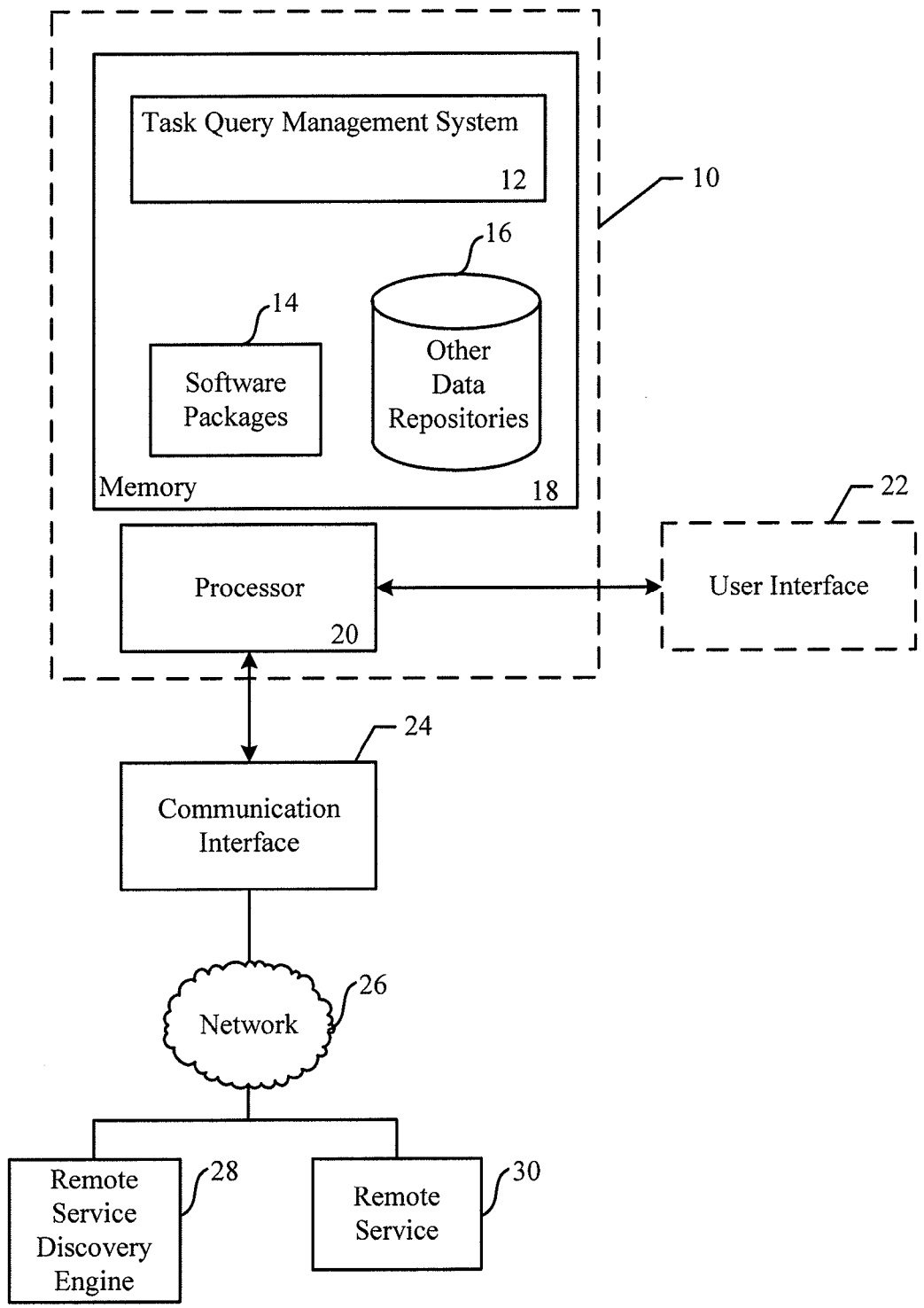
Figure 2:
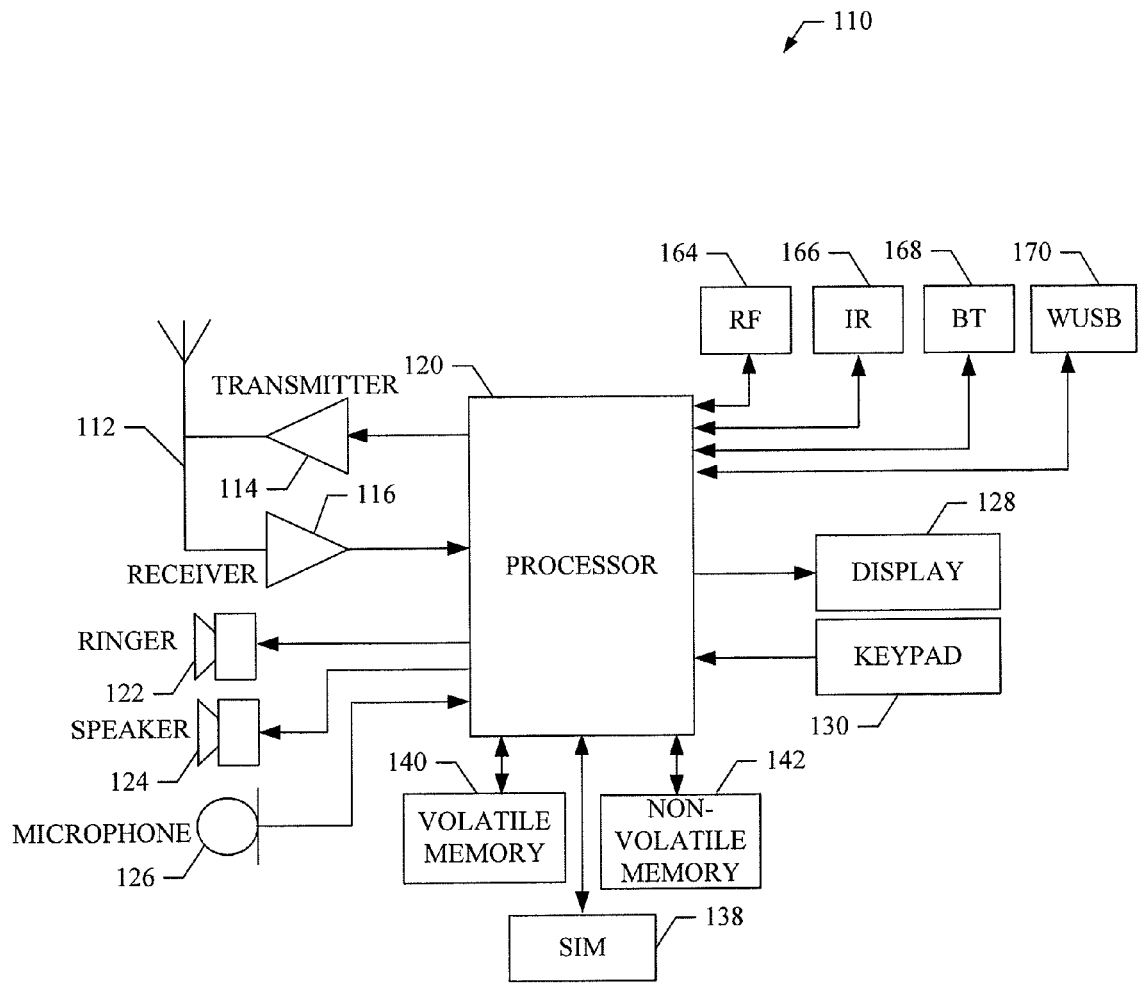
Figure 3:
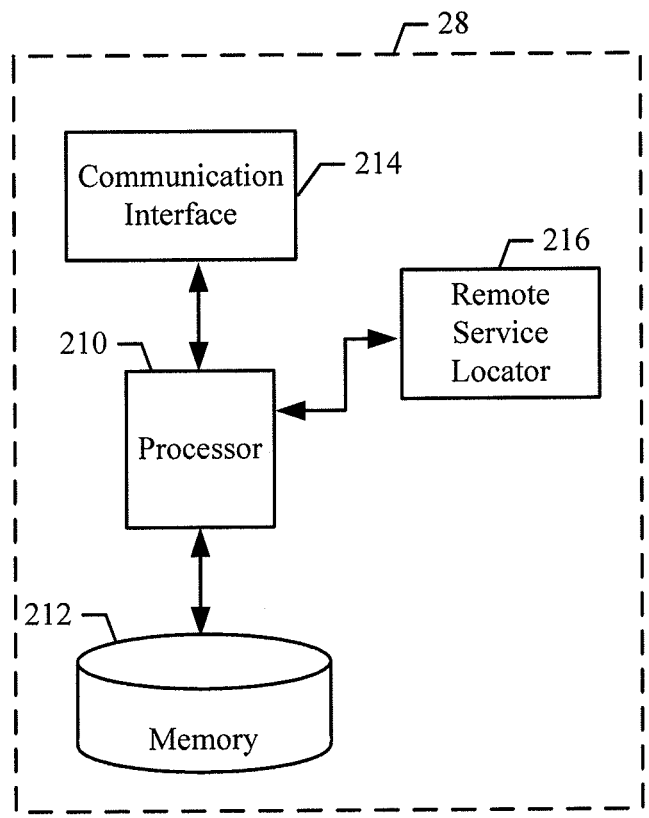
Figure 4A:
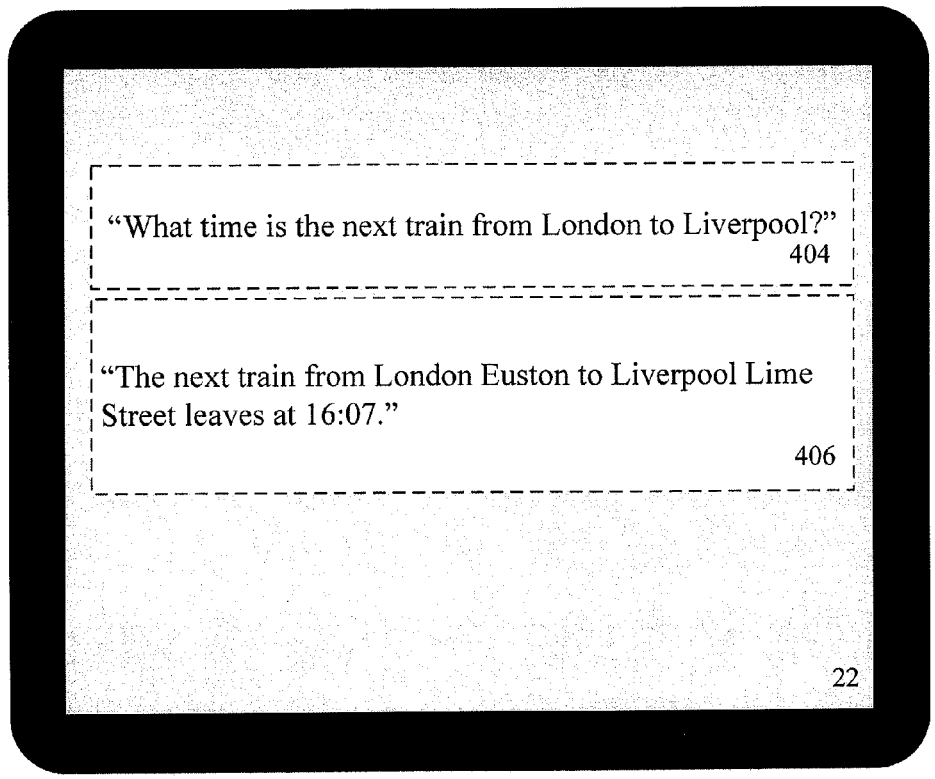
Figure 4B:
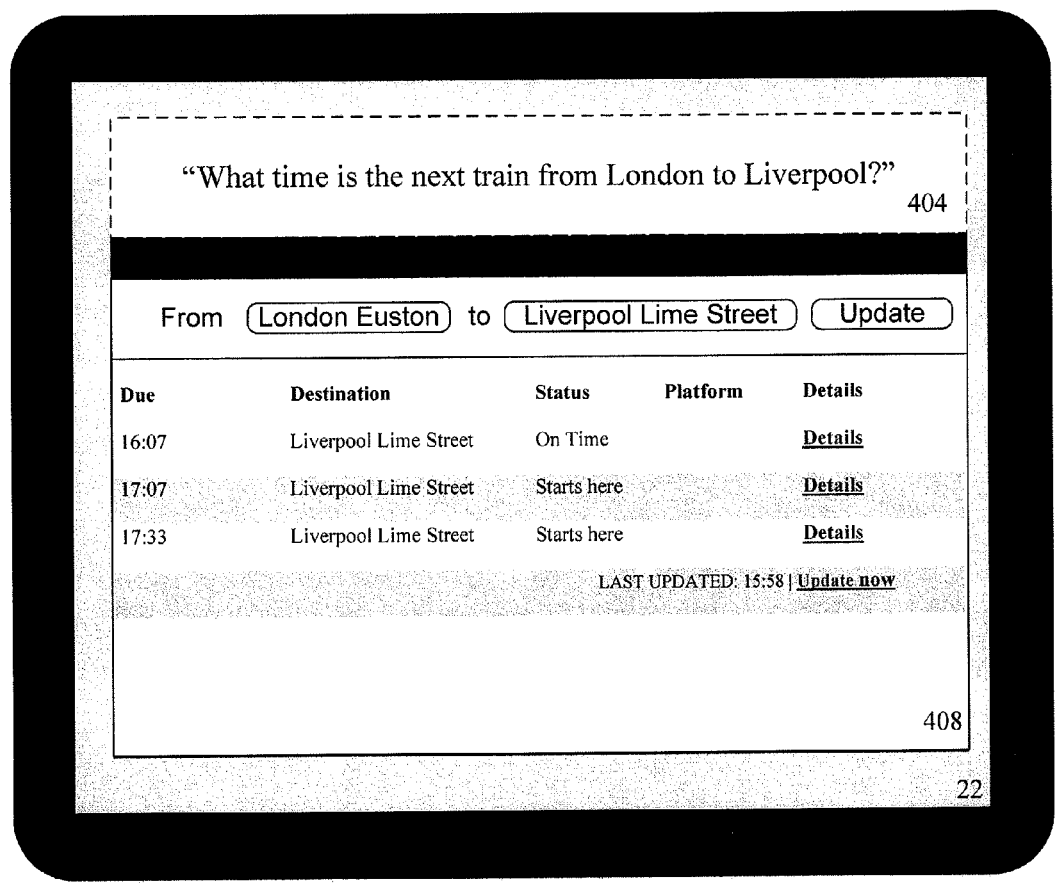
Figure 5:
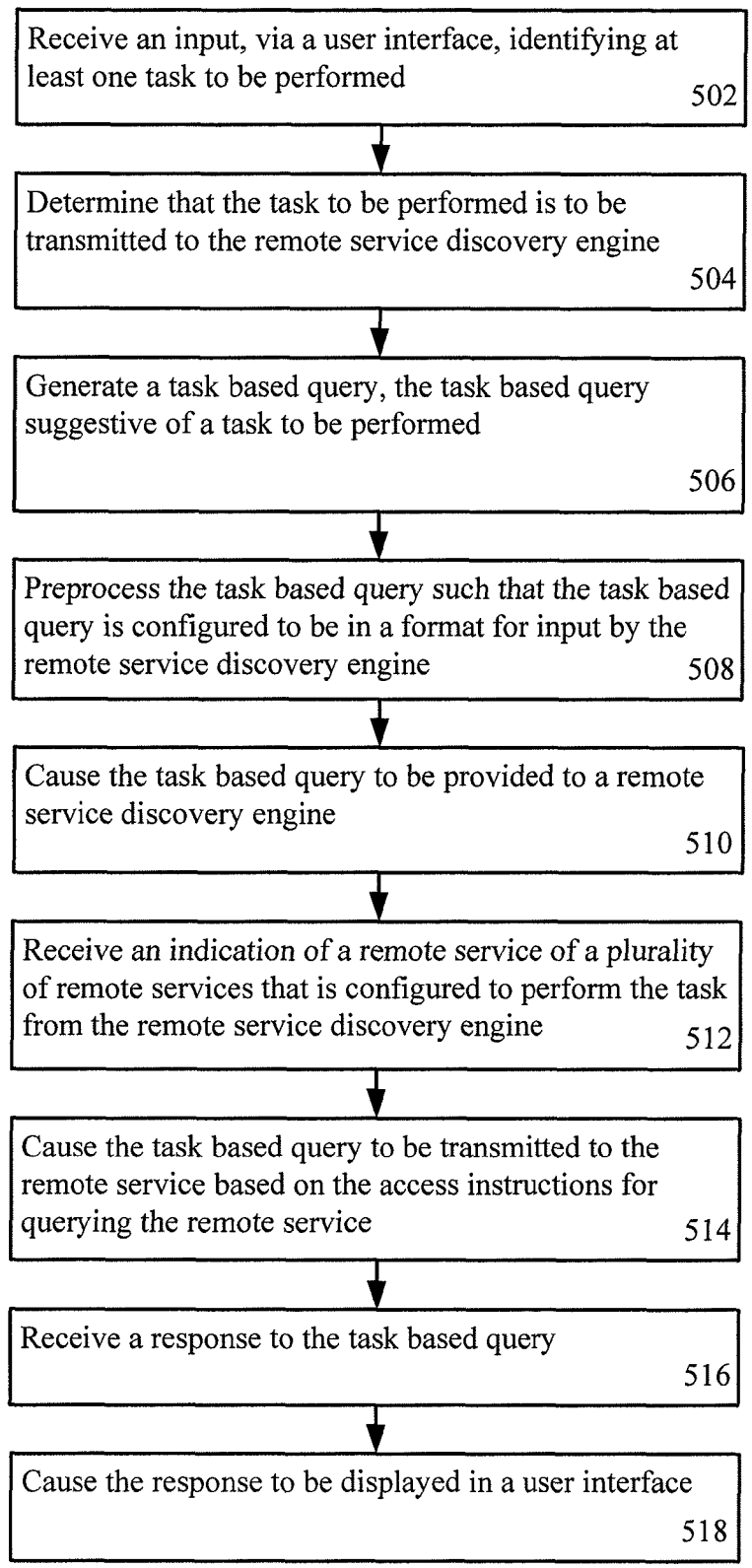
Figure 6:
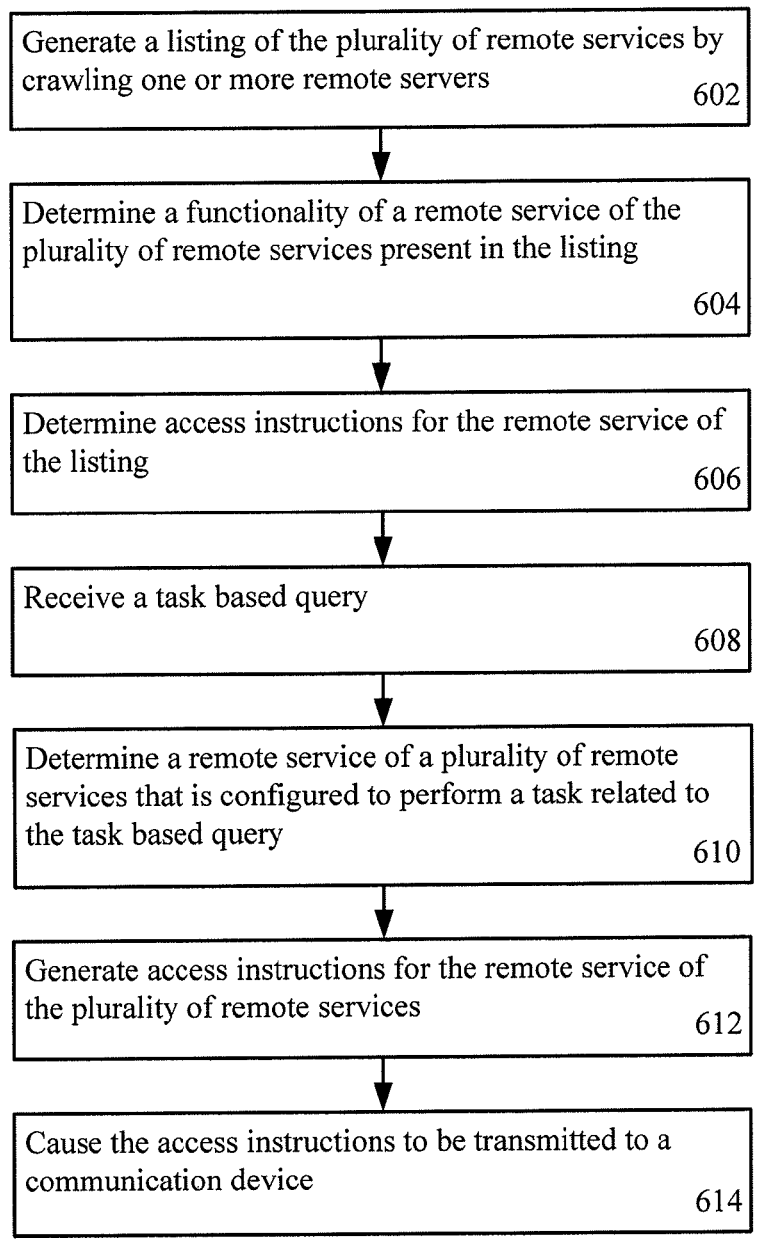

Having thus described embodiments of the invention in general terms, reference will now be made to the accompanying drawings, which are not necessarily drawn to scale, and wherein:

FIG. 1 illustrates a block diagram of an apparatus that embodies a task based system and provides access to remote services according to some example embodiments of the present invention;

FIG. 2 is a schematic block diagram of a mobile terminal according to some example embodiments of the present invention;

FIG. 3 illustrates a block diagram of an example remote service discover engine according to some example embodiments of the present invention;

FIGS. 4a and 4b illustrate an example user interfaces according to an example embodiment of the invention;

FIG. 5 illustrates a flowchart according to an example method of a task query apparatus according to an example embodiment of the invention; and FIG. 6 illustrates a flowchart according to an example method of a remote service discovery engine according to an example embodiment of the invention.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

Example operating system environments are generally application centric. In an example application centric operating system environment, a user is able to launch an application by selecting an icon or some other representation of the application. In application centric operating system environments, a user is required to select a particular application that would enable a particular set of tasks to be performed. Once inside the application, the user may then take a variety of different actions that may result in particular functionality. For example, an email application may be opened by selecting an icon that looks like a letter. Once opened, a user may read a message, send a message and/or the like. By way of further example, a user of an email application may have three different windows or views open, a first view that contains a draft email message to a first person, a second view containing a received message from a second person and a third containing an inbox. Further still, a user may also have a social media application open with a number of windows or views. In an example application centric operating system environment, the user may switch between currently active applications. The user however always enters the application through a front end that generally starts with a splash screen followed by a default view.

In some examples, an application centric operating system may comprise a process manager which may be further configured to display a list of applications and a list of windows that are tied to those one or more applications. In these cases and in an instance in which the system or user shuts down the application, then all windows related to that application may be removed and/or may disappear from view. Once removed from view, in order to access a particular feature or perform a task within the application, the user must again open the application and potentially navigate through a splash screen and then through the application to a screen that may provide the particular feature or functionality.

In some examples, an application centric operating system may respond to a voice prompt or other request from a user. However, the response is limited to the applications installed and/or the preconfigured responses provided by the application centric operating system. Additional input mechanisms may be used in conjunction with an application centric operating system, for example an input system that is configured to receive a command, such as a command "call" followed by an identifier. The command "call" being configured to activate a phone application and initiate a call to the provided identifier. Other short cuts such as "call home" or "call voicemail" may be used. However any shortcut, such as those shortcuts identified above, are configured to open an identified application and/or are directly tied to a particular application.

In some examples of a task based system, application icons may not be presented to the user, may be hidden or otherwise obscured in the user interface thus preventing a user from accessing an application directly. Alternatively or additionally, in some example embodiments described herein, an application may not be directly accessible by the user. Instead and in some example embodiments, a task based system is disclosed herein that is configured to enable a user to provide a task to be accomplished to the user interface. In response, the systems and methods described herein may cause a local software package and/or a remote service to provide a view, take an action, and/or provide subtask, thereby enabling the user to operate in terms of tasks to be accomplished and not in terms of specific applications. Further, the user is, for example, advantageously not limited by currently installed applications.

In some example embodiments, user interaction with a user interface is related to a task or a topic to be performed, an end state to be achieved, an intent to be carried out and/or like. In some examples, the task or topic received form the user is not application dependent, but instead is application independent. For example, an application independent task such as "play" may relate to subtasks such as "play music," "play video," "play a game," and/or the like. As such, the user may be prompted with those subtasks. Even in an instance in which the task provided by the user via the user interface is "play music," one or more software packages may be available that can provide music playing functionality. As such, a user may no longer be required to select a particular application and then navigate to a particular functionality of that application to perform a task, but instead may select a task without being concerned about choosing a particular software package that accomplishes the selected task.

In some example embodiments, a task may be defined as a method to invoke functionality in the one or more local software packages and/or a plurality of remote services. As such, the tasks that are exposed by the one or more local software packages function as an entry point into the one or more software packages. In other words, a local software package alone or in combination with a remote service may launch or build a view for the purpose of accomplishing the task. For example, and in response to a "play music" command, a music playing remote service may launch, build or otherwise provide a view that displays available music to be played.

By way of an additional example, a user may propose or input a task: "compose a status update." In response, the system as described herein, may determine that this task is related to social media applications and, as such, may be configured to build, launch or otherwise provide a view in a first social media software package that enables the user to perform a status update. Again, the status update view is built or launched via the task query management system without causing the user to navigate through the social media software package splash screen and through the other functionality of the software package in order to locate the status update functionality. After completing the status update, a new view from a remote service may be launched in an instance in which the task query management system determines that a local software packages does not provide functionality or does provide complete functionality requested via the task. Further and in some examples, the task may be provided to a remote service and, as such, the user may interact with the remote service via a user interface. In this case the task of performing a status update may be performed across multiple software packages and/or remote services, both local and remote, in order to accomplish the task. Alternatively or additionally, a task may be performed completely by a local software package, completely by a remote service or a combination of the both.

In some example embodiments, the one or more local software packages (e.g. software that is at least partially stored on a local device) may be configured to expose one or more tasks that the local software package is configured to perform. These exposed one or more tasks may then be selected by an example task query management system based on the task that was input via the user interface or otherwise provided to the system. However, in some instances, the one or more exposed tasks may not correlate to or otherwise be performed by the one or more exposed tasks. In such cases, a task based query may be generated based on the task. The task based query may be transmitted or otherwise provided to a remote service discovery engine.

In some example embodiments, the remote service discovery engine is configured to comprise a listing of available remote services. In some examples, a remote service is service that provides task-based user interface extensions that are accessed over a network. The remote service is further configured to present a view in a user interface (e.g. the service provides a user interface). For example, weather information may be provided in a particular view that is to be shown using the user interface. In other examples, a remote service may be configured to present data, information or the like that in turn can be used by a task query management system to represent the data, information or the like via the user interface (e.g. the service does not provide a user interface). For example, current weather information may be received, but the task query management system may present the weather data in any arrangement via a user interface. Advantageously the remote service is configured, for example, to extend the functionality of one or more local software packages, add additional functionality to the device and/or the like.

In response, the remote service discovery engine may provide the access information for a remote service to the task query management system. Such that, the task query management system may connect to or otherwise access the remote service to provide the requested functionality defined by the task.

FIG. 1 illustrates a block diagram of a task query apparatus 10 configured to perform task chaining according to some example embodiments of the present invention. It will be appreciated that the task query apparatus 10 is provided as an example of an embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating access to remote services other configurations may also be used to implement embodiments of the present invention.

The task query apparatus 10 may be embodied as a desktop computer, laptop computer, mobile terminal, tablet, mobile computer, mobile phone, mobile communication device, tablet, one or more servers, one or more network nodes, game device, digital camera/camcorder, audio/video player, television device, radio receiver, digital video recorder, positioning device, any combination thereof, and/or the like. In an example embodiment, the task query apparatus 10 may be embodied as a mobile terminal, such as that illustrated in FIG. 2.

In this regard, FIG. 2 illustrates a block diagram of a mobile terminal 110 representative of one embodiment of a task query apparatus 10. It should be understood, however, that the mobile terminal 110 illustrated and hereinafter described is merely illustrative of one type of a task query apparatus 10 implementation that may benefit from embodiments of the present invention and, therefore, should not be taken to limit the scope of the present invention. While several embodiments of the user terminal (e.g., mobile terminal 110, user equipment or like) are illustrated and will be hereinafter described for purposes of example, other types of user terminals, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 110 may include an antenna 112 (or multiple antennas 112) in communication with a transmitter 114 and a receiver 116. The mobile terminal 110 may also include a processor 120 configured to provide signals to and receive signals from the transmitter and receiver, respectively. The processor 120 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 120 comprises a plurality of processors. These signals sent and received by the processor 120 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal 110 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 110 may be capable of operating according to WiFi or Worldwide Interoperability for Microwave Access (WiMAX) protocols.

It is understood that the processor 120 may comprise circuitry for implementing audio/video and logic functions of the mobile terminal 110. For example, the processor 120 may comprise a digital signal processor device, a microprocessor device, an analog-to-digital converter, a digital-to-analog converter, and/or the like. Control and signal processing functions of the mobile terminal 110 may be allocated between these devices according to their respective capabilities. Further, the processor may comprise functionality to operate one or more software packages, which may be stored in memory. For example, the processor 120 may be capable of operating a software package that provides connectivity, such as a view that functions as a web browser. The connectivity program may allow the mobile terminal 110 to transmit and receive web content, such as location-based content, according to a protocol, such as Wireless Application Protocol (WAP), hypertext transfer protocol (HTTP), and/or the like. The mobile terminal 110 may be capable of using a Transmission Control Protocol/Internet Protocol (TCP/IP) to transmit and receive web content across the internet or other networks.

The mobile terminal 110 may also comprise a user interface including, for example, an earphone or speaker 124, a ringer 122, a microphone 126, a display 128, a user input interface, and/or the like, which may be operationally coupled to the processor 120. In this regard, the processor 120 may comprise user interface circuitry configured to control at least some functions of one or more elements of the user interface, such as, for example, the speaker 124, the ringer 122, the microphone 126, the display 128, and/or the like. The processor 120 and/or user interface circuitry comprising the processor 120 may be configured to control one or more functions of one or more elements of the user interface through computer program instructions (e.g., software and/or firmware) stored on a memory accessible to the processor 120 (e.g., volatile memory 140, non-volatile memory 142, and/or the like). The mobile terminal 110 may comprise sensors, such as a GPS 136, which may determine location information for the user. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 130, a touch display (not shown), a joystick (not shown), and/or other input device. In embodiments including a keypad, the keypad may comprise numeric (0-9) and related keys (#, *), and/or other keys for operating the mobile terminal.

The mobile terminal 110 may comprise memory, such as a smart cart, subscriber identity module or subscriber identification module (SIM), a removable user identity module (R-UIM), and/or the like, which may store information elements related to a mobile subscriber. In addition to the SIM, the mobile terminal may comprise other removable and/or fixed memory. The mobile terminal 110 may include other non-transitory memory, such as volatile memory 140 and/or non-volatile memory 142. For example, volatile memory 140 may include Random Access Memory (RAM) including dynamic and/or static RAM, on-chip or off-chip cache memory, and/or the like. Non-volatile memory 142, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 140 non-volatile memory 142 may include a cache area for temporary storage of data. The memories may store one or more software programs, instructions, pieces of information, data, and/or the like which may be used by the mobile terminal for performing functions of the mobile terminal. For example, the memories may comprise an identifier, for example an international mobile equipment identification (IMEI) code, capable of uniquely identifying the mobile terminal 110.

Returning to FIG. 1, in an example embodiment, a task query apparatus 10 includes various means for performing the various functions herein described. These means may comprise one or more of a task query management system 12, at least one memory 18, at least one processor 20, a user interface 22, and a communication interface 24. The means of the task query apparatus 10 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 18) that is executable by a suitably configured processing device (e.g., the processor 20), or some combination thereof.

Note that one or more general purpose or special purpose computing systems/devices may be used to implement the task query apparatus 10. In addition, the task query apparatus 10 may comprise one or more distinct computing systems/devices and may span distributed locations. Furthermore, each block shown may represent one or more such blocks as appropriate to a specific embodiment or may be combined with other blocks. For example, in some embodiments, the task query apparatus 10 may contain a task query management system 12. In other example embodiments a task query management system 12 may be configured to operate remotely. In some example embodiments, a pre-computation module may be configured to perform the computational load and thus may be on a remote device. In some example embodiments, the task query apparatus 10 may contain a remote service discovery engine 28, however in other embodiments, the remote service discovery engine 28 may be configured to operate at least partially remotely, or completely remotely. Also, the task query apparatus 10 and/or the task query management system 12 may be implemented in software, hardware, firmware, or in some combination to achieve the capabilities described herein.

In an example embodiment, components/modules of the task query apparatus 10 are implemented using standard programming techniques. For example, the task query apparatus 10 may be implemented as a "native" executable running on the processor 20, along with one or more static or dynamic libraries. In other embodiments, the task query apparatus 10 may be implemented as instructions processed by a virtual machine that executes as another program or software package. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., Structured Query Language (SQL), Prolog, and the like).

The embodiments described above may also use either well-known or proprietary synchronous or asynchronous client-server computing techniques. Also, the various components may be implemented using more monolithic programming techniques, for example, as an executable running on a single processor computer system, or alternatively decomposed using a variety of structuring techniques known in the art, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the task query apparatus 10 can be made available by standard mechanisms such as through C, C++, C#, and Java application programming interfaces; libraries for accessing files, databases, or other data repositories; through languages such as Extensible Markup Language (XML); or through Web servers, File Transfer Protocol (FTP) servers, or other types of servers providing access to stored data.

Different configurations and locations of programs and data are contemplated for use with techniques described herein. A variety of distributed computing techniques are appropriate for implementing the components of the illustrated embodiments in a distributed manner including but not limited to Transmission Control Protocol (TCP)/Internet Protocol (IP) sockets, remote procedure call (RPC), Remote Method Invocation (RMI), HTTP, Web Services (XML-remote procedure call (RPC), JAX-RPC, Simple Object Access Protocol (SOAP), and the like). Other variations are possible. Also, other functionality could be provided by each component/module, or existing functionality could be distributed amongst the components/modules in different ways, yet still achieve the functions described herein.

The processor 20 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, or some combination thereof. Accordingly, although illustrated in FIG. 1 as a single processor, in some embodiments the processor 20 comprises a plurality of processors. The plurality of processors may be in operative communication with each other and may be collectively configured to perform one or more functionalities of the task query apparatus 10 as described herein. The plurality of processors may be embodied on a single computing device or distributed across a plurality of computing devices collectively configured to function as the task query apparatus 10. In embodiments wherein the task query apparatus 10 is embodied as a mobile terminal 110, the processor 20 may be embodied as or comprise the processor 120. In an example embodiment, the processor 20 is configured to execute instructions stored in the memory 18 or otherwise accessible to the processor 20. These instructions, when executed by the processor 20, may cause the task query apparatus 10 to perform one or more of the functionalities of the task query apparatus 10 as described herein. As such, whether configured by hardware or software methods, or by a combination thereof, the processor 20 may comprise an entity capable of performing operations according to embodiments of the present invention while configured accordingly. Thus, for example, when the processor 20 is embodied as an ASIC, FPGA or the like, the processor 20 may comprise specifically configured hardware for conducting one or more operations described herein. Alternatively, as another example, when the processor 20 is embodied as an executor of instructions, such as may be stored in the memory 18, the instructions may specifically configure the processor 20 to perform one or more algorithms and operations described herein.

The memory 18 may comprise, for example, transitory and/or non-transitory memory, such as volatile memory, non-volatile memory, or some combination thereof. Although illustrated in FIG. 1 as a single memory, the memory 18 may comprise a plurality of memories. The plurality of memories may be embodied on a single computing device or may be distributed across a plurality of computing devices collectively configured to function as the task query apparatus 10. In various example embodiments, the memory 18 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the task query apparatus 10 is embodied as a mobile terminal 110, the memory 18 may comprise the volatile memory 140 and/or the non-volatile memory 142. The memory 18 may be configured to store information, data, applications, other data repositories, such as data repository 16, instructions, or the like for enabling the task query apparatus 10 to carry out various functions in accordance with various example embodiments.

The communication interface 24 may be embodied as any device or means embodied in circuitry, hardware, a computer program product comprising computer readable program instructions stored on a computer readable medium (e.g., the memory 18) and executed by a processing device (e.g., the processor 20), or a combination thereof that is configured to receive and/or transmit data to/from another computing device. For example, the communication interface 24 may be configured to receive application data over a network. The task query apparatus 10 may interact via the network 26 via a communication interface 24 with one or more remote service discovery engines 28 and/or with remote services 30. The network 26 may be any combination of media (e.g., twisted pair, coaxial, fiber optic, radio frequency), hardware (e.g., routers, switches, repeaters, transceivers), and protocols (e.g., TCP/IP, LTE, UDP, Ethernet, Wi-Fi, WiMAX) that facilitate communication between remotely situated humans and/or devices. In this regard, the communication interface 24 may be capable of operating with one or more air interface standards, communication protocols, modulation types, access types, and/or the like.

The user interface 22 may be in communication with the processor 20 to receive an indication of a user input, such as a task to be performed, at the user interface and/or to provide an audible, visual, mechanical or other output to the user. As such, the user interface may include, for example, a keyboard, a mouse, a trackball, a display, a touch screen, a microphone, a speaker, multimodal interface and/or other input/output mechanisms.

While the task query apparatus 10 may be employed, for example, by a mobile terminal and/or a stand-alone system (e.g. remote server), it should be noted that the components, devices or elements described below may not be mandatory and thus some may be omitted in certain embodiments. Additionally, some embodiments may include further or different components, devices or elements beyond those shown and described herein.

Referring now to FIG. 3, FIG. 3 illustrates a block diagram of a remote service discovery engine 28 according to an example embodiment. In an example embodiment, the remote service discovery engine 28 may comprise various means for performing the various functions herein described. These means may comprise one or more of a processor 210, memory 212, communication interface 214, or remote service locator 216. The means of the remote service discovery engine 28 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 212) that is executable by a suitably configured processing device (e.g., the processor 210), or some combination thereof.

In some example embodiments, one or more of the means illustrated in FIG. 3 may be embodied as a chip or chip set. In other words, the remote service discovery engine 28 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 210, memory 212, communication interface 214, and/or remote service locator 216 may be embodied as a chip or chip set. The remote service discovery engine 28 may therefore, in some example embodiments, be configured to implement embodiments of the present invention on a single chip or as a single "system on a chip." As another example, in some example embodiments, the remote service discovery engine 28 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 210 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other hardware processors, or some combination thereof. Accordingly, although illustrated in FIG. 3 as a single processor, in some embodiments the processor 210 may comprise a plurality of processors. The plurality of processors may be in operative communication with each other and may be collectively configured to perform one or more functionalities of the remote service discovery engine 28 as described herein. The plurality of processors may be embodied on a single computing device or distributed across a plurality of computing devices collectively configured to function as the remote service discovery engine 28. In some example embodiments, the processor 210 may be configured to execute instructions stored in the memory 212 or otherwise accessible to the processor 210. These instructions, when executed by the processor 210, may cause the remote service discovery engine 28 to perform one or more of the functionalities of the remote service discovery engine 28 as described herein. As such, whether configured by hardware or software methods, or by a combination thereof, the processor 210 may comprise an entity capable of performing operations according to embodiments of the present invention while configured accordingly. Thus, for example, when the processor 210 is embodied as an ASIC, FPGA or the like, the processor 210 may comprise specifically configured hardware for conducting one or more operations described herein. Alternatively, as another example, when the processor 210 is embodied as an executor of instructions, such as may be stored in the memory 212, the instructions may specifically configure the processor 210 to perform one or more algorithms and operations described herein.

The memory 212 may comprise, for example, volatile memory, non-volatile memory, or some combination thereof. In this regard, the memory 212 may comprise a non-transitory computer-readable storage medium. Although illustrated in FIG. 3 as a single memory, the memory 212 may comprise a plurality of memories. The plurality of memories may be embodied on a single computing device or may be distributed across a plurality of computing devices collectively configured to function as the remote service discovery engine 28. In various example embodiments, the memory 212 may comprise a hard disk, random access memory, cache memory, flash memory, a CD-ROM, DVD-ROM, an optical disc, circuitry configured to store information, or some combination thereof. The memory 212 may be configured to store information, data, applications, instructions, or the like for enabling the remote service discovery engine 28 to carry out various functions in accordance with various example embodiments. For example, in some example embodiments, the memory 212 may be configured to buffer input data for processing by the processor 210. Additionally or alternatively, the memory 212 may be configured to store program instructions for execution by the processor 210. The memory 212 may store information in the form of static and/or dynamic information. This stored information may be stored and/or used by the remote service locator 216 during the course of performing its functionalities.

The communication interface 214 may be embodied as any device or means embodied in circuitry, hardware, a computer program product comprising computer readable program instructions stored on a computer readable medium (for example, the memory 212) and executed by a processing device (for example, the processor 210), or a combination thereof that is configured to receive and/or transmit data from/to another computing device. In an example embodiment, the communication interface 214 may be at least partially embodied as or otherwise controlled by the processor 210. In this regard, the communication interface 214 may be in communication with the processor 210, such as via a bus. The communication interface 214 may include, for example, an antenna, a transmitter, a receiver, a transceiver and/or supporting hardware or software for enabling communications with one or more remote computing devices. The communication interface 214 may be configured to receive and/or transmit data using any protocol that may be used for communications between computing devices. In this regard, the communication interface 214 may be configured to receive and/or transmit data using any protocol that may be used for transmission of data over a wireless network, wireline network, some combination thereof, or the like by which the remote service discovery engine 28 and one or more computing devices or computing resources may be in communication. As an example, the communication interface 214 may be configured to enable communication with a task query apparatus 10 via the network 26, a radio uplink, and/or the like. The communication interface 214 may additionally be in communication with the memory 212, and/or remote service locator 216, such as via a bus.

The remote service locator 216 may be embodied as various means, such as circuitry, hardware, a computer program product comprising computer readable program instructions stored on a computer readable medium (for example, the memory 212) and executed by a processing device (for example, the processor 210), or some combination thereof and, in some embodiments, is embodied as or otherwise controlled by the processor 210. In embodiments wherein the remote service locator 216 may be embodied separately from the processor 210, the remote service locator 216 may be in communication with the processor 210. The remote service locator 216 may further be in communication with one or more of the memory 212 or communication interface 214, such as via a bus.

An example task query apparatus 10 is configured, in some example embodiments, to enable a user to interact in a task based environment with one or more local software packages 14 and a plurality of remote services via a user interface 22. The user interface 22 is configured to receive the one or more task requests from a user, an application, a user interacting with an application, a sensor, or the like. The task requests may take the form of a selection, a text input, a voice command and/or other multimodal input. The user interface 22 is then configured to pass the one or more task requests to the task query management system 12.

The task query management system 12 may then query or otherwise determine from the one or more local software packages 14 whether a task is available that matches and/or is similar to the received task. A task matches or is similar to another task in an instance which the task, received via the user interface 22, has a similar intent, end state, purpose or the like to the one or more tasks exposed by the one or more local software packages 14. In an instance in which the task query management system 12 determines, that the received task does not match an exposed task, the task query management system 12 may be configured to generate a task based query for transmission to the remote service discovery engine 28. Alternatively or additionally, the task query management system 12 may determine that additional functionality, additional features, an improved user experience or the like may result in a task based query being generated.

In some example embodiments, the task based query may take the form of a text string corresponding to the received task. In such examples, the task based query may be in the form of a request. For example, translate 'hello' from English to Welsh". In some example embodiments, the task query management system 12 may generate a task based query based on an intent, end state, purpose, requested functionality or the like of the input task. Alternatively or additionally, the task query management system 12 may perform pre-processing of the search query, such as via the processor 20. For example, the task based query may be configured to identify that the task is a translation request between two languages.

The task query management system 12 is further configured to cause the task based query to be transmitted, such as via the communication interface 24, to the remote service discovery engine 28. In some example embodiments, the remote service discovery engine 28 is accessible via network 26, however, at least a portion of the remote service discovery engine 28 may be stored in the memory 18. Alternatively or additionally, a plurality of remote service discovery engines 28 may be available or otherwise accessible by the task query apparatus 10.

In some example embodiments, the remote service discovery engine 28 is configured to determine, access or otherwise crawl, such as via the remote service locator 216, a plurality of remote services 30 to determine a functionality and access information for each of the remote services. In some example embodiments, the remote service discovery engine 28, the remote service locator 216, or the like may function as a search engine that is configured to crawl or otherwise locate the plurality of remote services 30. In some examples, the description of the functionality of the remote service might be made in any predefined way that the remote service discovery engine can ingest. Alternatively or additionally, the access information can similarly be provided in any suitable format that is configured to provide enough information to enable the task query management system 12 to transmit a properly-formatted query to the remote service and for the task query management system 12 to understand the results received from the remote service. For example, the remote service discovery engine 28 may access a text file or other indication stored in conjunction with the remote service that indicates its functionality as a remote service and access information. Alternatively or additionally, remote services may register with the remote service discovery engine 28.

The access information may include instructions for interacting with the remote service, such as, but not limited to: a) how to format a query to send to the remote service, b) where to send it (e.g. a uniform resource locator, a fully qualified domain name), and c) how to interpret the result returned by the remote service. In some examples, more than one type of function may be offered by the remote service.

In some example embodiments, the appropriate function of the remote service is chosen by the task query management system 12 and access information for that function is provided to the task query management system 12. Alternatively or additionally, the task query management system 12 may provide all the information (e.g. all of the functions) to the task query management system 12 to enable the task query management system 12 to determine what function provided by a remote service to use.

The access information may be configured to enable a mobile terminal 110, task query apparatus 10 or the like to access the remote service 30 directly. In some example embodiments, the access information for the remote service may be stored, such as in the memory 18 for future access to the remote service 30. In such cases, the stored access information may be regularly updated so as to enable communications with the plurality of remote services 30. Alternatively or additionally, the task query management system 12 may be configured to access the remote service discovery engine 28 for each request to ensure updated information is provided to the task query management system 26. Alternatively or additionally, the remote service discovery engine 28 may be configured to operate as a portal and as such may provide a connection, such as via communication interface 214, with the remote service 30.

In response to the task based query, the remote service discovery engine 28 may be configured to determine at least one remote service of the plurality of remote services 30 that corresponds to or otherwise provides functionality related to the received task based query. In some example embodiments, a list of available remote services may be provided to the task query apparatus 10. The available remote services may then be presented to the user interface 22 for selection by the user. Alternatively or additionally, the task query management system 12 and/or the remote service discovery engine 28 may select a remote service of the plurality of remote services 30 based on a predefined criteria, such as a cost to access, a user rating, a popularity, a last update time, a user preference and/or the like. For example if the task request was: "What is the breaking news?" then a user may be more interested in a less popular news service that has been updated in the last few minutes than a very popular news service that hasn't been updated since last week.

Upon selection and/or receipt of a remote service 30, the task query management system 12 is configured to generate a request for the remote service 30. The request is formatted according to the access instructions received from the remote service discovery engine 28. The task query management system 12 may then cause the request to be transmitted to the remote service, such as via the communication interface 24, the network 26 and/or the like. In response, the task query management system 12 may receive a user interface view (e.g. a web portal view, a remote view or the like) from the remote service 30 that may be provided to a user via user interface 22. Alternatively or additionally, the task query management system 12 may receive text, data or other information to be displayed in the user interface. In such embodiments, the remote service 30 may not be configured to provide a user interface, and as such the user interface is constructed by the task query management system 12 based on the output received from the remote service 30.

FIG. 4*a* illustrates an example user interface according to an example embodiment of the invention. By way of example, a user may input, via the user interface 22, a request 404. The request 404 may be generated via text input, voice command or the like. In this example, the example input comprises "What time is the next train from London to Liverpool?" In response, the task query management system 12 is configured to determine whether one or more exposed tasks by the one or more local software packages 14 are configured to provide the requested functionality, in this example a train time table. Upon determination that the one or more local software packages 14 are not configured to perform the task, the task query management system 12 is configured to generate a task based query for the remote service discovery engine 28. In this example, a task based query may include the entire string "What time is the next train from London to Liverpool?" Alternatively or additionally, the task query management system 12 may cause a search to be performed, such as via a search engine.

As is described herein, the remote service discovery engine 28 may be configured to crawl or otherwise determine the functionality of one or more remote services 30. In this example, the remote service discovery engine 28 may have discovered two remote services that relate to train timetables. For example, the first may be "Network Rail Journey Planner" and the second may be "Train Times". Each remote service may have provided or otherwise allowed the remote service discovery engine 28 to determine a description of the functionality of the remote service and also the access information including the form (syntax etc.) of queries accepted by the remote service. In this example, the remote service may provide the following:

Network Rail Journey Planner
Description: UK Train Railway Timetable Departures Arrivals Stations
Interface: [Details on formatting of queries sent to and results sent from the service]
Train Times
Description: Russian Train Railway Timetables
Interface: [Details on formatting of queries sent to and results sent from the service]

In some example embodiments, the remote service discovery engine 28 is configured to determine a remote service 30 that provides functionality for the requested task 404. As such the remote service discovery engine may apply semantic knowledge, such that the words "train" and "time" that are selected from the requested task 402 and as such the remote service discovery engine 28 may determine that a remote service relating to train timetables has been requested. The remote service discovery engine 28 may also recognizes "London" and "Liverpool" as cities in the United Kingdom (UK) and may therefore locate a remote service having UK train timetables. As such, the remote service discovery engine 28 may determine that the Network Rail Journey Planner is the closer match of the two example remote services available in this example.

In some example embodiments, the remote service discovery engine may then identify the network rail journey planner to the task query management system 12. The remote service discovery engine 28 is further configured to provide the access information for the network rail journey planner. In some example, the access information may include information on how to connect with the network rail journey planner. In this example the network rail journey planner may have a syntax of "GetTime ([Origin], [Destination], [Time], [Date])." As such, the task query management system 12 may cause a request, using the syntax above, to be transmitted to the Network Rail server. For example "GetTime (London, Liverpool, [Time], [Date])".

In response, the network rail planner may return a result in a format as described in the access information provided by the remote service discovery engine 28. For example, the rail planner may provide details for the next five trains, but the task query management system 12, may only cause the next train to be displayed in the user interface 22, such as is displayed in box 406. Alternatively or additionally, the rail planner may have provided a user interface, such as in a web browser 408, which is configured to be shown in user interface 22 as shown in FIG. 4b.

Alternatively or additionally, a task may be generated automatically. For example, a local software package may be available that provides an option to book tickets to watch a film at nearby cinema. However, the user may select a cinema that is not listed in the local software package, as such the remote service discovery engine 28 may be automatically queried to locate a remote service that provides functionality for the selected cinema. In such cases, the remote service may provide additional functionality to the local software package or may be provided in the user interface 22 in a stand-alone fashion.

FIGS. 5 and 6 illustrate example flowcharts of the operations performed by a task query apparatus 10, the remote service discovery engine 28 and/or the mobile terminal 110, in accordance with one embodiment of the present invention. It will be understood that each block of the flowchart, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 18, volatile memory 140, non-volatile memory 142 and/or the memory 212, of an apparatus employing an embodiment of the present invention and executed by a processor 20, processor 120 and/or the processor 210 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 5 and 6, when executed, convert a computer or processing circuitry into a particular machine configured to perform an example embodiment of the present invention. Accordingly, the operations of FIG. 5 define an algorithm for configuring a computer or processor, to perform an example embodiment. In some cases, a general purpose computer may be provided with an instance of the processor which performs the algorithm of FIGS. 5 and 6 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In some embodiments, certain ones of the operations herein may be modified, marked option or further amplified as described below. Moreover, in some embodiments additional optional operations may also be included (some examples of which are shown in dashed lines in FIG. 5). It should be appreciated that each of the modifications, optional additions or amplifications below may be included with the operations above either alone or in combination with any others among the features described herein.

FIG. 5 illustrates a flowchart according to an example method of a task query apparatus according to an example embodiment of the invention. As shown in operation 502, an apparatus embodied, for example, by a task query apparatus 10 and/or a mobile terminal 110, may include means, such as the task query management system 12, the processor 20, the user interface 22 or the like, for receiving an input, via a user interface, identifying at least one task to be performed. In some example embodiments, the task based query is generated based on the input. In some example embodiments, the task based query is generated in response to a current task being performed by at least one of a remote service of the plurality of remote services or a local software package of a plurality of local software packages.

As shown in operation 504, an apparatus embodied, for example, by a task query apparatus 10 and/or a mobile terminal 110, may include means, such as the task query management system 12, the processor 20 or the like, for determining that the task to be performed is to be transmitted to the remote service discovery engine, the determination based on a determined functionality of a plurality of local software packages. As shown in operation 506, an apparatus embodied, for example, by a task query apparatus 10 and/or a mobile terminal 110, may include means, such as the task query management system 12, the processor 20 or the like, for generating a task based query, the task based query suggestive of a task to be performed. As shown in operation 508, an apparatus embodied, for example, by a task query apparatus 10 and/or a mobile terminal 110, may include means, such as the task query management system 12, the processor 20 or the like, for preprocessing the task based query such that the task based query is configured to be a format for input by the remote service discovery engine.

As shown in operation 510, an apparatus embodied, for example, by a task query apparatus 10 and/or a mobile terminal 110, may include means, such as the task query management system 12, the processor 20, the communication interface 24 or the like, for causing the task based query to be provided to a remote service discovery engine. As shown in operation 512, an apparatus embodied, for example, by a task query apparatus 10 and/or a mobile terminal 110, may include means, such as the task query management system 12, the processor 20, the communication interface 24 or the like, for receiving an indication of a remote service of a plurality of remote services that is configured to perform the task from the remote service discovery engine, the indication comprising access instructions for querying the remote service. In some example embodiments, the remote service discovery engine comprises a registry that defines a functionality for the plurality of remote services and provides communication instructions for the plurality of remote services.

As shown in operation 514, an apparatus embodied, for example, by a task query apparatus 10 and/or a mobile terminal 110, may include means, such as the task query management system 12, the processor 20, the communication interface 24 or the like, for causing the task based query to be transmitted to the remote service based on the communication instructions for querying the remote service.

As shown in operation 516, an apparatus embodied, for example, by a task query apparatus 10 and/or a mobile terminal 110, may include means, such as the task query management system 12, the processor 20, the communication interface 24 or the like, for receiving a response to the task based query. In some example embodiments, the remote service is selected based on a user interaction with the user interface. In some example embodiments, the remote service is selected based on at least one of a cost to access, a user rating, a popularity, a last update time or a user preference. As shown in operation 518, an apparatus embodied, for example, by a task query apparatus 10 and/or a mobile terminal 110, may include means, such as the task query management system 12, the processor 20, the user interface 22 or the like, for causing the response to be displayed in a user interface.

FIG. 6 illustrates a flowchart according to an example method of a remote service discovery engine according to an example embodiment of the invention. As shown in operation 602, an apparatus embodied, for example, by a remote service discovery engine 28, may include means, such as processor 210, the communication interface 214 or the like, for generating a listing of the plurality of remote services by crawling one or more remote servers. As shown in operation 604, an apparatus embodied, for example, by a remote service discovery engine 28, may include means, such as processor 210 or the like, for determining a functionality of a remote service of the plurality of remote services present in the listing. In some example embodiments, the functionality of the remote service comprises a description of the nature of the service. As shown in operation 606, an apparatus embodied, for example, by a remote service discovery engine 28, may include means, such as processor 210 or the like, for determining access instructions for the remote service of the listing. In some example embodiments, the access instructions for the remote service comprise syntax information and a description of a format in which a response is provided.

As shown in operation 608, an apparatus embodied, for example, by a remote service discovery engine 28, may include means, such as processor 210, the communication interface 214 or the like, for receiving a task based query. As shown in operation 610, an apparatus embodied, for example, by a remote service discovery engine 28, may include means, such as processor 210 or the like, for determining a remote service of a plurality of remote services that is configured to perform a task related to the task based query. As shown in operation 612, an apparatus embodied, for example, by a remote service discovery engine 28, may include means, such as processor 210 or the like, for generating access instructions for the remote service of the plurality of remote services, the access instructions comprising access instructions for querying the remote service. As shown in operation 614, an apparatus embodied, for example, by a remote service discovery engine 28, may include means, such as processor 210, the communication interface 214 or the like, for causing the access instructions to be transmitted to a communication device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    receiving an input, via a user interface, identifying at least one task to be performed, wherein the task is independent of a particular software package;
    generating a task based query at a task query apparatus, the task based query suggestive of the task to be performed, wherein the task based query is generated based on the input;
    determining, based on functionalities of a plurality of software packages local to the task query apparatus, that at least one software package of the plurality of software packages is configured to perform the task in an instance in which the task matches at least one of a an intent, end state, or purpose to the functionalities exposed by the plurality of software packages local to the task query apparatus;
    causing, in an instance in which at least one software package of the plurality of software packages that are local to the task query apparatus is not configured to perform the task, the task based query to be provided from the task query apparatus to a remote service discovery engine, wherein the remote service discovery engine comprises a registry that defines a functionality for a plurality of remote services and provides access instructions for independently connecting with a remote service of the plurality of remote services, wherein the remote service is configured to provide at least one of the requested functionality via a user interface or additional functionality for one or more local packages, such that the one or more local packages are able to perform the requested task;
    receiving, at the task query apparatus, from the remote service discovery engine and as a response to the task based query, an indication of a remote service of the plurality of remote services that is configured to perform the task based on the functionality of the remote service, the indication comprising access information for querying the remote service;
    causing a task based query to be transmitted from the task query apparatus, to the remote service that is formatted according to the access information, wherein the access information for the remote service comprises syntax information and a description of a format in which a response is provided; and
    causing a response to the task based query that is received from the remote service to be displayed via the user interface.

2. A method according to claim 1, wherein the task based query is generated in response to a current task being performed by at least one of a remote service of the plurality of remote services or a local software package of a plurality of software packages local to the task query apparatus.

3. A method according to claim 1, further comprising:
    preprocessing the task based query such that the task based query is configured to be in a format for input by the remote service discovery engine.

4. A method according to claim 1, wherein the remote service discovery engine comprises a registry that defines a functionality for the plurality of remote services and provides access information for the plurality of remote services.

5. A method according to claim 1, wherein the response for display in the user interface is generated by the remote service.

6. A method according to claim 1, further comprising:
    receiving more than one remote service of the plurality of remote services; and
    selecting a remote service of the more than one remote services.

7. A method according to claim 6, wherein the remote service is selected based on a user interaction with the user interface.

8. A method according to claim 6, wherein the remote service is selected based on at least one of a cost to access, a user rating, a popularity, a last update time or a user preference.

9. An apparatus comprising:
    at least one processor; and
    at least one memory including computer program code, the at least one memory and the computer program code configured to, with the at least one processor, cause the apparatus to at least:
    receive an input, via a user interface, identifying at least one task to be performed, wherein the task is independent of a particular software package;
    generate a task based query at a task query apparatus, the task based query suggestive of the task to be performed, wherein the task based query is generated based on the input;
    determine, based on functionalities of a plurality of software packages local to the task query apparatus, that at least one software package of the plurality of software packages is configured to perform the task in an instance in which the task matches at least one of an intent, end state, or purpose to the functionalities exposed by the plurality of software packages local to the task query apparatus;
    cause, in an instance in which at least one software package of the plurality of software packages that are local to the task query apparatus is not configured to perform the task, the task based query to be provided from the task query apparatus to a remote service discovery engine, wherein the remote service discovery engine comprises a registry that defines a functionality for a plurality of remote services and provides access instructions for independently connecting with a remote service of the plurality of remote services, wherein the remote service is configured to provide at least one of the requested functionality via a user interface or additional functionality for one or more local packages, such that the one or more local packages are able to perform the requested task;

receive, at the task query apparatus, from the remote service discovery engine and as a response to the task based query, an indication of a remote service of the plurality of remote services that is configured to perform the task based on the functionality of the remote service, the indication comprising access information for querying the remote service;

cause the task based query to be transmitted from the task query apparatus, to the remote service that is formatted according to the access information, wherein the access information for the remote service comprises syntax information and a description of a format in which a response is provided; and cause a response to the task based query that is received from the remote service to be displayed via the user interface.

10. An apparatus according to claim 9, wherein the remote service discovery engine comprises a registry that defines a functionality for the plurality of remote services and provides access information for the plurality of remote services.

* * * * *

UNITED STATES PATENT AND TRADEMARK OFFICE
CERTIFICATE OF CORRECTION

PATENT NO. : 9,519,506 B2
APPLICATION NO. : 13/538767
DATED : December 13, 2016
INVENTOR(S) : Collin et al.

It is certified that error appears in the above-identified patent and that said Letters Patent is hereby corrected as shown below:

In the Claims

Column 21,
Line 38-39, Claim 1 "a an intent" should read --an intent--;
Line 64, Claim 1 "causing a the task" should read --causing the task--.

Signed and Sealed this
Tenth Day of October, 2017

Joseph Matal
*Performing the Functions and Duties of the
Under Secretary of Commerce for Intellectual Property and
Director of the United States Patent and Trademark Office*